Oct. 13, 1959
C. L. MUNSON
2,908,834
AIR-COOLED EDDY CURRENT COUPLER DEVICE
Filed July 30, 1958
2 Sheets-Sheet 1
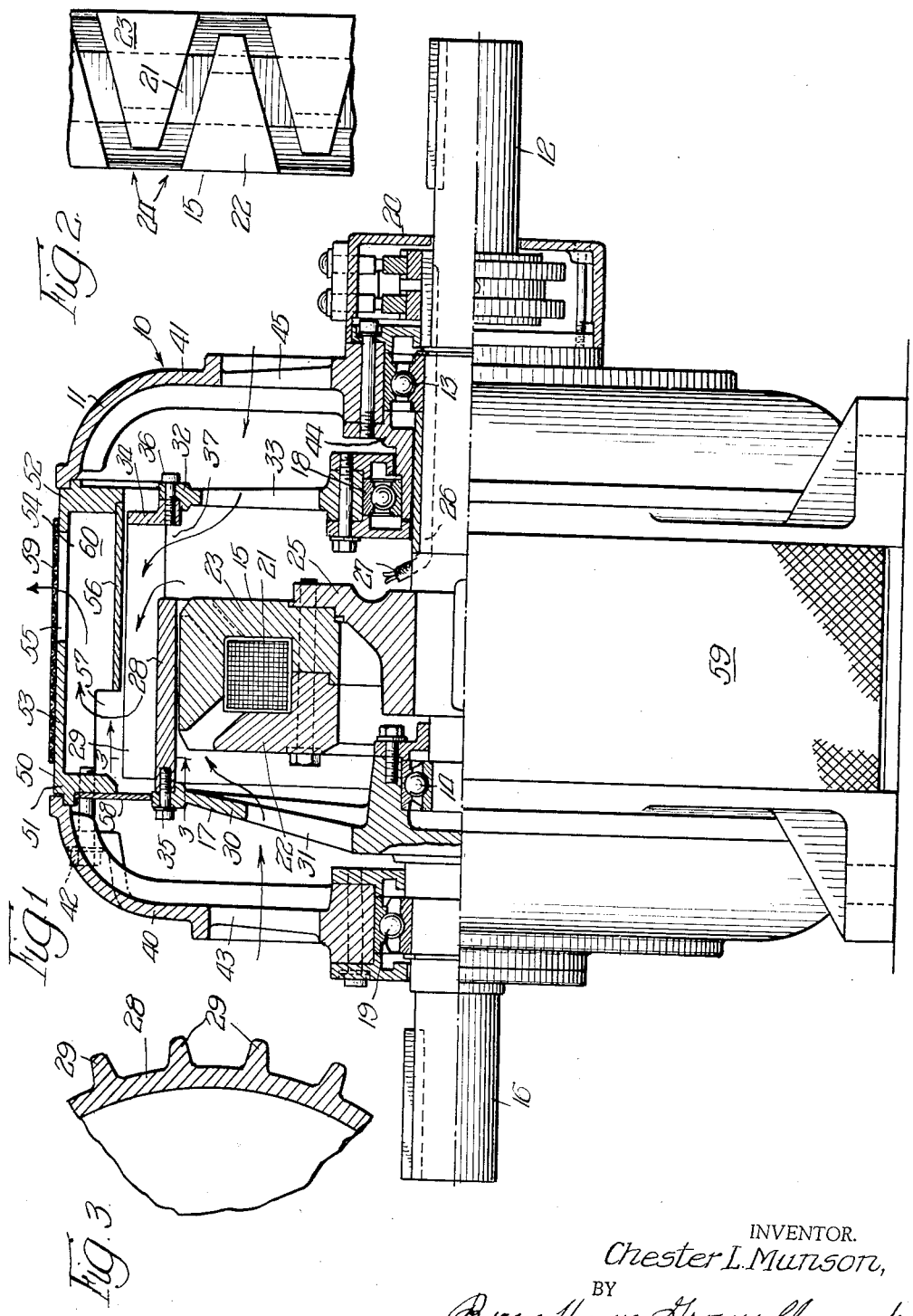
INVENTOR.
Chester L. Munson,
BY
Byron, Hume, Groen + Clement
Attys.

Oct. 13, 1959
C. L. MUNSON
2,908,834
AIR-COOLED EDDY CURRENT COUPLER DEVICE
Filed July 30, 1958
2 Sheets-Sheet 2
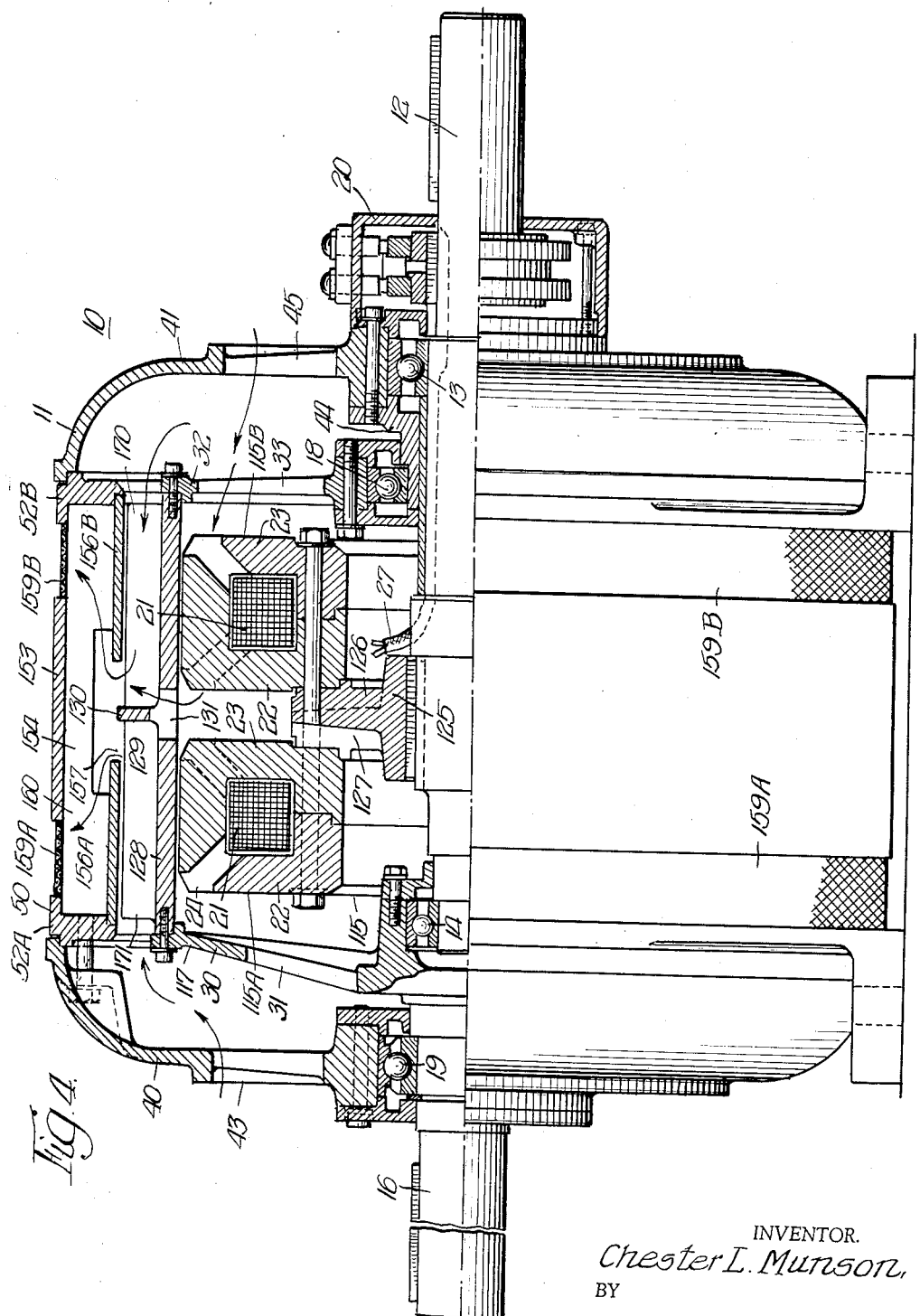
INVENTOR.
Chester L. Munson,
BY
Buron, Hume, Groen + Clement.
Attys

United States Patent Office 2,908,834
Patented Oct. 13, 1959

2,908,834

AIR-COOLED EDDY CURRENT COUPLER DEVICE

Chester L. Munson, Kenosha, Wis., assignor to The Louis Allis Co., Milwaukee, Wis., a corporation of Wisconsin Application July 30, 1958, Serial No. 752,089

11 Claims. (Cl. 310—105)

The present invention relates to eddy current coupler devices and particularly to structural arrangements effective for cooling such machines.

An eddy current coupler is a rotary machine made up essentially of a magnetic field member and an inductor member arranged to support an interlocking flux path, wherein at least one of the members is movable relative to the other. Due to the relative rotation of the magnetic field member and the inductor, magnetic flux is moved in the inductor causing eddy currents to be induced therein. These induced eddy currents develop a second magnetic field which produces a relative torque between the members, the strength of which is determined directly by the strength of the primary field and the speed differential between the two members. This difference in speed is known as slip. Generally, as the slip increases, more and stronger eddy currents are developed which in turn produce a greater relative torque between the field member and the inductor member. Dependent upon the type of pole arrangement employed in the field member, the torque-slip curve may exhibit a continuous tendency to rise or it may rise to a maximum and thereafter decrease with increasing slip.

This eddy current-torque characteristic is utilized in a clutch arrangement for controlling the torque applied to a drive; it is utilized in a brake arrangement for controlling the torque of a driven member; and it is utilized in a dynamometer arrangement for purposes of measuring the torque of a driven member.

A considerable amount of heat is developed in these couplers which corresponds to the slip power loss and one of the problems presented in the utilization of such equipment is the provision of means for adequately cooling the coupler. The problem is actually two-phased, that is, the heat must first be efficiently and effectively collected from the inductor drum and then carried from the coupler unit without adding substantially to the physical size or complexity of the unit.

It is a general object of the present invention to provide a new and improved air-cooled eddy curent coupler structure capable of efficiently and effectively collecting and carrying away from the coupler unit increased amounts of heat.

An additional object of the invention is to provide an improved structure for air cooled eddy current couplers for dissipating increased amounts of heat from the unit and for providing a substantially noiseless exhaust.

A further object of the invention is to provide an improved eddy current coupler unit of the air cooled type wherein substantial quantities of air are traversed across the surfaces of the inductor drum thereby to collect the heat generated therein and wherein the heated air is channeled into an exhaust chamber in which the air is expanded, cooled and the velocity thereof decreased and the flow redirected and dispersed so that the cooling air is diffused into the surrounding atmosphere without the normally associated windage.

A further object of the invention is to provide new and improved support structure for the rotatable members of an eddy current coupler in order to increase the operational life of the equipment and effect a high volume flow of cooling air.

Further objects and features of the invention pertain to the particular structure and arrangement whereby the above listed objects are achieved.

The invention, both as to its structure and mode of operation, will be better understood with reference to the following drawings wherein:

Figure 1 is a side view, partially in section, of an eddy current coupler device constructed in accordance with the principles of the present invention;

Figure 2 is a top plan view of a portion of a rotary field member employed in the eddy current clutch device of Figure 1;

Figure 3 is a cross-sectional view of a portion of the inductor drum employed in the eddy current coupler device of Figure 1 as taken along lines 3—3 therein; and Figure 4 is a side view, partially in section, of an alternative eddy current coupler device constructed in accordance with the principles of the present invention.

Referring now to the drawings, there is shown in Figure 1 an eddy current coupler device 10 of the clutch type made up of a casing 11 including a driven shaft 12 carrying thereon a driven rotor 15 and supported on bearings 13 and 14, and a drive shaft 16 carrying on its end an eddy current rotor 17 supported mutually on the bearings 18 and 19. Additionally, there is carried on the casing 11 in association with the driven shaft 12, a slip ring structure 20 by means of which electrical current is fed to the driven rotor 15.

As shown in Figures 1 and 2, the driven rotor 15 is the magnetic field member and is made up of an annular field coil 21 which is centrally supported within a pair of intermeshing magnetic spiders 22 and 23 provided with a plurality of transverse channels 24 extending between the teeth of the spiders 22 and 23. The rotor 15 is supported on a hub 25 which is joined directly to the extension of the driven shaft 12. The driven shaft 12 includes therein an axial slot 26 extending between the hub 25 and the slip ring 20 and in which is carried a conductor 27 by means of which current is supplied to the field coil 21 from the slip ring structure 20. The slip ring structure 20 may be of the conventional construction employed in coupling devices and in electric motors.

The eddy current rotor 17, as shown in Figures 1 and 3, is made up of a drum 28 having formed on the outer surface thereof a plurality of axially extending fins 29, a spider 30 provided with openings 31 and a spider 32 provided with openings 33. The drum and the fins are made of magnetic material and the fins 29 are axially continuous with the drum 28 and overextend the drum at one end thereof being joined at their extreme ends by an annular ring 34 to define an annular aperture 37 in the rotor. The spider 30 is attached to one end of the drum 28 by means of bolts 35 and the spider 33 is attached to the annular ring 34 by means of bolts 36. The spider 30 serves as a driving head for the eddy current rotor 17 and is keyed or otherwise connected to the interior end of the drive shaft 16. The spider 32 provides additional support for the eddy current rotor at its extreme end and is supported on the bearing 18.

The casing 11 is made up of opposing end pieces 40 and 41 joined to a central annular unit 50 by means of bolts 42. The end piece 40 is provided with a central aperture in which the main bearing 19 is mounted and is provided with a plurality of axial apertures 43 for communicating air to the interior of the coupler device. The end piece 41 is provided with a central aperture in which the bearing 13 is supported and carries thereat on its exterior face the slip ring arrangement 20 and on its interior face an internally projecting flange 44 in which the bearing 18 is mounted. The end piece 41 is also provided with a plurality of axial openings 45 for communicating air to the interior of the coupler arrangement.

The central portion 50 of the casing 11 is made up of an annular ring 51 and of an annular ring 52 wherein the annular ring 51 includes an axial extension 53 which forms a portion of the outer wall of the casing 11. These two ring members are joined by radially spaced apart support members 54 so as to define between the extension 53 of the annular ring 51 and the annular ring 52 and annular aperture 55 communicating between the exterior and interior of the coupling device.

An annular plate 56 is carried on the member 54 and the annular ring 52 opposite the aperture 55 so as to define with the annular ring 51 and its extension 53 an annular chamber 60 provided with an annular aperture 57 positioned opposite the extension 53. An annular ring 58 is carried by the ring 51 and extends inwardly in close proximity to the outer periphery of the spider 30.

In the arrangement shown, eddy currents in the drum 28 generate heat which must be dissipated and the fins 29 thereon act both as radiating surfaces and as fan blades. In the arangement shown, the annular plate 56 associated with the casing 11 is closely spaced from the tips of the fins 29 so that the centrifugal fan action of the fins is restricted only to the area of the annular aperture 57. This produces a low pressure area along those portions of the fins enclosed by the annular member 56 and at the annular aperture 37 in the rotor 17 so that air is drawn to the eddy current rotor at that point. Accordingly, a flow of air is experienced from the exterior of the eddy current coupler in a path through the axial apertures 43 in the side 40 of the casing 11, through the apertures 31 in the spider 30, the channels 24 of the driven rotor 15 past both the magnetic spider 22 and 23 and the inner surface of the drum 28 to the annular aperture 37 absorbing heat from both the field member and inductor. Additionally, air flows to the annular aperture 37 in a path through the axial apertures 45 in the casing 41 and through the apertures 33 in the web 32. At the aperture 37 the supplied air is diverted into axial flow between the adjacent fins 29, the outer surface of the drum 29 and the inner surface of the annular member 56 to the annular aperture 57 absorbing heat from the drum 28 and the fins 29. At this point the air is highly heated and under increased pressure so that it tends to move at a very high velocity. Due to the fan action of the fins 29 this air is pumped into the annular chamber 60 defined by the rings 51, 52 and 58 and the annular plate 56. The annular chamber 60 is of a volume substantially greater than the sum of the volumes of the axial flow chambers in the inductor 17 so that the heated air is expanded and its velocity substantially reduced. In addition, the direction of movement of the air in the annular chamber is redirected by virtue of the staggered relationship between the annular apertures 57 and 55 and the exhaust air is diffused at the annular aperture 55 through the screen 59 into the exterior atmosphere.

From the foregoing description it is seen that air flows in a smooth even pattern across both faces of the inductor drum thereby deriving maximum cooling from the air and that the heated air is directed into an expansion chamber wherein it is permitted to expand to more than twice its heated volume thereby to decrease its velocity of movement and is exhausted in a diffused manner into the exterior air. There is no windage and there is no forced directional flow of air so that cooling is effected substantially noiselessly and without a heated exhaust blast.

It will be noted that in the achievement of the objects of the present invention, an improved and substantial support arrangement for the rotating members of the eddy current coupler is employed. Specifically, the eddy current rotor 17 and the drive shaft 16 are made to be a substantially integral unit supported along its central axis at two spaced points in the casing 11 by the bearings 18 and by the bearings 19. Accordingly, rotation of the eddy current rotor 17 is balanced and true and will remain as such. The driven rotor 15 is integrated with the driven shaft 12 and this unit is also supported along its axis at two distinctly spaced points by means of the bearing 13 and the bearings 14. As previously pointed out the bearing 13 is mounted in the end casing 41 whereas the bearings 14 are mounted in the stable unit formed by the drive shaft 16 and the eddy current rotor drum 17. Accordingly, rotation of the driven rotor 33 is balanced and true and will not be subject to easy misalignment.

A variation of the arrangement of Figure 1 as adapted to a multiple field unit is shown in Figure 4. In the arrangement shown, reference characters of Figure 1 are aplied to those elements in the arrangement of Figure 4 which are identical to corresponding elements in Figure 1. In this arrangement, the driven rotor 115 is made up of two field members 115A and 115B each constructed like the driven rotor 15 of Figure 1. In this arrangement the field generators are supported by a central head 125 provided with a plurality of radially directed impeller blades 126 and slots 127 therebetween.

The eddy current rotor 117 is provided with a drum 128 carrying on the outer surface a plurality of radially spaced apart fins 129 wherein the fins are joined by arcuate sections 130. The drum 128 includes a centrally disposed anular aperture 131 in alignment with the spacing between the pair of field generating members 115A and 115B.

The central portion 50 of the casing 11, to which the end pieces 40 and 41 are attached, is made up of a pair of end rings 52A and 52B joined by an axially extending support member 154. A pair of annular plates 156A and 156B are carried by the annular rings 52A and 52B and the axial support member 154 so as to define a central annular aperture 157. In addition, there is carried on the axial support members 154 an exterior annular plate 153 placed opposite the annular aperture 157 to define with the annular rings 52A and 52B the exhaust apertures 159A and 159B. In this arrangement the annular plates 156 form with the fins 129 of the eddy current rotor 17 the axial apertures 170 and 171 through which air is drawn across the exterior surface of the drum 128.

In this arrangement air flows, for example, through the axial apertures 43 in the end piece 40 through the axial aperture 171 into the axial chamber formed by the fins 129, the drum 128, the annular plate 156A and the annular ring segments 130 and through the annular aperture 157 into the chamber 160. Therein the body velocity of the air is dispelled and the air is expanded and diffused through the openings 159A and 159B. In addition, air drawn through the axial aperture 43 is carried through the axial aperture 31 of the web 30 in two paths, one through the channels 24 in the field member 115A across the magnetic spiders 22 and 23 thereof and the interior face of the drum 128 and through the aperture 131 past the annular segments 130 to the aperture 157 of the chamber 160. Additionally, air carried through the axial aperture 31 is flowed through the open center of the field member 115A, the slots 127 in the head 125 and into the channel formed between the field members 115A and 115B to the annular aperture 131 in the drum 128. Similar patterns of flow are experienced by air drawn into the unit through the apertures 45 in the end piece 41 of the casing.

In this arrangement, a substantial quantity of the air is drawn past both surfaces of the eddy current drum 128 and over the field members 115A and 115B for purposes of effecting cooling of these components. The heat ladened air is propelled into the exhaust chamber 160 wherein the air is expanded, cooled and the body velocity thereof diminished so that the air is diffused to the exterior of the feed current coupler unit, damped both as to noise and velocity.

It is to be noted that the axially extending support members 54 and 154 of the arrangements of Figure 1 and 4, respectively, are retracted at the areas of the apertures 57 and 157, respectively, for purposes of eliminating noises that might be developed by the high speed movement of the inductor fins past these members.

In view of the foregoing, it is believed that there has been provided herein a substantially improved eddy current coupler design for air cooled clutch type units wherein a continuous flow of cooling air is efficiently directed across the heated surfaces of an inductor drum and the field member associated therewith and deflected and expanded so that the cooling air is exhausted substantially noiselessly and with a minimum velocity into the surrounding air.

While the arrangements described herein are at present considered to be preferred it is to be understood that variations and modifications may be made therein, and it is intended to cover in the appended claims all such variations and modifications as fall within the true spirit and scope of the invention.

What is claimed is:

1. In an eddy current coupler device, a rotary field member, a rotary inductor enclosing said field member and made up of a drum carrying therein heat generating flux paths and eddy currents and formed on the outer surface thereof in a plurality of fins overextending said drum, and casing means for said inductor including an annular chamber provided with a radial inlet and a radial outlet axially spaced apart one from another for supporting an axial flow of air therein and forming with said inductor a plurality of axial air passages provided with a radial outlet, wherein the radial outlet of said axial passages is identical to the radial inlet of said annular chamber, the volume of said annular chamber being greater than the volume of the sum of said axial passages whereby the air in flow through said axial passages absorbs heat from said inductor and is expanded and cooled in said annular chamber for discharge at a reduced velocity through the radial outlet thereof.

2. In an eddy current coupler device, a rotary field member, a rotary inductor enclosing said field member and made up of a drum carrying therein heat generating flux paths and eddy currents and formed on the outer surface thereof in a plurality of fins overextending said drum, a casing enclosing said rotary field member and said inductor provided with axial openings for communicating air to the interior of said coupler, a first annular member in said casing closely spaced apart from the tips of said fins and coextensive with a portion of the length thereof, whereby there is formed by said inductor and said annular member a plurality of axial passages each including a radially directed outlet, and a second annular member in said casing spaced apart from said first annular member overextending the radially directed outlet of said axial passages and overextending a portion of said first annular member to form an annular chamber, the volume of said annular chamber being greater than the volume of the sum of said axial passages whereby the air in flow through said axial passages absorbs heat from said inductor and is expanded and cooled in said annular chamber for discharge at a reduced velocity through the radial outlet thereof.

3. In an eddy current coupler device, a rotary field member, a rotary inductor enclosing said field member and made up of a drum overextending said field member only at one edge thereof and formed on the outer surface thereof in a plurality of fins overextending said field member at both edges thereof, said fins being evenly spaced apart on said drum, a casing enclosing said rotary field member and said inductor provided with axial openings for communicating air to the interior of said coupler, a first annular member in said casing closely spaced apart from the tips of said fins and coextensive with a portion of the length thereof, whereby there is formed by said inductor and said annular member a plurality of axial passages for continuing said axial flow of air, each of said axial passages including a radially directed inlet and a radially directed outlet, and a second annular member in said casing spaced apart from said first annular member overextending the radially directed outlet of said axial passages and overextending a portion of said first annular member to form an annular chamber, the volume of said annular chamber being greater than the volume of the sum of said axial passages whereby the air in flow through said axial passages absorbs heat from said inductor and is expanded and cooled in said annular chamber for discharge at a reduced velocity through the radial outlet thereof.

4. In an eddy current coupler device, a rotary field member provided with axially extending channels in the circumferential surface thereof, a rotary inductor enclosing the circumferential surface of said field member, said rotary inductor including a drum closely spaced apart from the surface of said field member and overextending said field member at one end thereof and carrying on the outer surface thereof a plurality of fins overextending both ends of said field member thereby overextending said drum to define a first annular aperture therein, a casing enclosing said rotary field member and said inductor provided with axial openings on the side thereof adjacent the overextending portion of the inductor drum for admitting a flow of air to the interior of said coupler, a first annular member in said casing closely spaced apart from the tips of said fins and coextensive with a portion of the length thereof for forming with said inductor a plurality of axial air flow passages and for forming with said casing a second annular aperture, and a second annular member in said casing spaced apart from said first annular member overextending said second annular aperture and a portion of said first annular member to define with said casing and said first annular member an annular chamber in communication with said axial passages at said second annular aperture and to define with said casing a third annular aperture for exhausting air from the interior of said casing, the volume of said annular chamber being substantially greater than the volume of the sum of said axial passages, whereby air is flowed through the axial openings in said casing in one path through the channels of said field member and said first annular aperture to the second annular aperture of said axial passages and in another path through said axial chambers to said second annular aperture in order to absorb the heat from said field member and said inductor, said heated air then being flowed into said annular chamber through said second annular aperture wherein it is expanded and cooled and diffused through said third annular aperture at a reduced velocity.

5. The eddy current coupler device set forth in claim 4 wherein said first annular member and said second annular member are spaced apart in said casing by a plurality of spacers arranged axially in said annular chamber wherein said spacers are cut away in proximity to said second annular aperture thereby to provide a wide gap between said spacers and the fins of said inductor.

6. In an eddy current coupler device, a rotary field member provided with axially extending channels in the circumferential surface thereof, a rotary inductor enclosing the circumferential of said field member, said rotary inductor including a drum closely spaced apart from the surface of said field member and overextending said field member at one end thereof and carrying on the outer surface thereof a plurality of fins overextending both ends of said field member thereby overextending said drum to define a first annular aperture therein, a casing enclosing said rotary field member and said inductor, axial openings at both ends of said casing for admitting a flow of air to the interior of said casing, a first annular member in said casing closely spaced apart from the tips of said ribs and coextensive with a portion of the length thereof for forming with said inductor a plurality of axial air flow passages and for forming with said casing a second annular aperture, and a second annular member in said casing spaced apart from said first annular member overextending said second annular aperture and a portion of said first annular member to define with said casing and said first annular member an annular chamber in communication with said axial passages at said second annular aperture and defining with said casing a third annular aperture for exhausting air from the interior of said casing, the volume of said annular chamber being substantially greater than the volume of the sum of said axial passages, whereby air is flowed in said device in one path through the axial openings at one end of said casing and the channels of said field member to said first annular aperture and in another path through the axial openings at the other end of said casing to said first annular aperture in order to absorb heat from said field member, whereby air at said first annular aperture is flowed through said annular passages over said inductor for purposes of removing heat from said inductor and to said second annular aperture, and whereby air at said second annular aperture is flowed into said annular chamber wherein said air is expanded and cooled, and discharged through said third annular aperture at a reduced velocity.

7. In an eddy current coupler device, a pair of axially spaced apart annular field members mounted to a central web member for rotation, each of said field members being provided with axially extending channels in the circumferential surface thereof, a rotary inductor enclosing the circumferential surface of said field member, said rotary inductor including a corresponding pair of drums closely spaced from the surfaces of said field members and overextending said field members at the remote ends thereof and axially spaced apart to form a first annular aperture in alignment with the spacing between said field members, said rotary inductor further including a plurality of fins joining said pair of drums and carried on the outer surface thereof in coextension therewith, a casing enclosing said rotary field member and said inductor, axial openings at both ends of said casing for admitting a flow of air to the interior of said casing, a pair of axially spaced apart first annular members in said casing defining a second annular aperture closely spaced from the tips of said fins and coextending said ribs for defining with said inductor a plurality of axial air flow passages each provided with an axial aperture in communication with the axial apertures of said casing, and a second annular member in said casing spaced apart from said pair of first annular members overextending said second annular aperture and a portion of each first annular member to define with said casing and said first annular member an annular chamber in communication with said axial passages at said second annular aperture and defining with said casing a pair of third annular apertures opposite said first annular members for exhausting air from said annular chamber, the volume of said annular chamber being substantially greater than the volume of the sum of said axial passages, whereby air is flowed past each field member from the associated axial opening in the casing in one path through the channels in the field member to the first annular aperture and in a second path through said central web and the annular spacing between field members to the first annular aperture for absorbing heat from said field member, whereby air is flowed over each drum from the associated axial opening in said casing in a path through said axial apertures and said axial passages to said second annular aperture for purposes of removing heat from said inductor, whereby air is flowed from said first annular aperture to said second annular aperture and from said second annular aperture into said annular chamber wherein said air is expanded and cooled and discharged through said pair of third annular apertures at a reduced velocity.

8. The eddy current coupler device set forth in claim 7 in further combination with a plurality of arcuate segments interconnecting said plurality of ribs at the center of said first aperture thereby to split said axial chambers into two halves and act as deflectors for directing air flow from said first annular aperture and said axial passages to said second annular aperture.

9. In an eddy current coupler device, a rotary field member, a rotary inductor enclosing said field member and made up of a drum carrying therein heat generating flux paths and eddy currents and formed in an outer surface thereof in a plurality of fins overextending said drum, and casing means for said inductor including an annular chamber provided with a radial inlet and a radial outlet axially spaced apart one from another for supporting an axial flow of air therein and forming with said inductor a plurality of axial air passages provided with a radial outlet, wherein the radial outlet of said axial passages is identical to the radial inlet of said annular chamber.

10. In an eddy current coupler device, a rotary field member, a rotary inductor enclosing said field member and made up of a drum carrying therein heat generating flux paths and eddy currents and formed on the outer surface thereof in a plurality of fins overextending said drum, and stationary casing means closely spaced apart from the peripheral path defined by the fins of the rotary inductor, said casing means forming with said inductor and the fins thereof a plurality of axial air passages provided with a radial outlet, said casing means including an annular chamber provided with a radial inlet and a radial outlet spaced apart one from another for supporting an axial flow of air therein, wherein the radial outlet of said axial air passages is identical to the radial inlet of said annular chamber.

11. In an eddy current coupler device, a rotary field member, a rotary inductor enclosing said field member and made up of a drum carrying therein heat generating flux paths and eddy currents and formed on the outer surface thereof in a plurality of radially projecting fins axially overextending said drum at one end thereof, and stationary casing means closely spaced apart from the peripheral path defined by the fins of the rotary inductor, said casing means forming with said inductor and the fins thereof a plurality of axial air passages provided with a radial inlet at the overextending portions of said fins and a radial outlet axially spaced apart therefrom, said casing means including an annular chamber provided with a radial inlet and a radial outlet spaced apart one from another for supporting an axial flow of air therein, wherein the radial outlet of said axial air passages is identical to the radial inlet of said annular chamber.

References Cited in the file of this patent

UNITED STATES PATENTS

| | | |
|---|---|---|
| 2,484,138 | Winther | Oct. 11, 1949 |
| 2,538,797 | Oetzel | Jan. 23, 1951 |